(12) United States Patent
Tsubaki et al.

(10) Patent No.: US 10,937,599 B2
(45) Date of Patent: Mar. 2, 2021

(54) ELECTROLYTIC CAPACITOR

(71) Applicant: Panasonic Intellectual Property Management Co., Ltd., Osaka (JP)

(72) Inventors: Yuichiro Tsubaki, Kyoto (JP); Tatsuji Aoyama, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/842,342

(22) Filed: Apr. 7, 2020

(65) Prior Publication Data

US 2020/0234889 A1 Jul. 23, 2020

Related U.S. Application Data

(63) Continuation of application No. 16/121,631, filed on Sep. 5, 2018, now Pat. No. 10,643,795, which is a
(Continued)

(30) Foreign Application Priority Data

Mar. 16, 2016 (JP) .............................. JP2016-052193

(51) Int. Cl.
*H01G 9/035* (2006.01)
*H01G 9/028* (2006.01)
(Continued)

(52) U.S. Cl.
CPC ............. *H01G 9/035* (2013.01); *H01G 9/028* (2013.01); *H01G 9/145* (2013.01); *H01G 9/15* (2013.01);
(Continued)

(58) Field of Classification Search
CPC .......... H01G 9/035; H01G 9/145; H01G 9/15; H01G 11/48; H01G 9/025; C08G 61/126
See application file for complete search history.

(56) References Cited

U.S. PATENT DOCUMENTS 9,916,935 B2 * 3/2018 Navratil ................. H01G 9/052
10,377,908 B2 8/2019 Matsubayashi et al.
(Continued)

FOREIGN PATENT DOCUMENTS

JP 2006-108650 A 4/2006
JP 2012-109635 A 6/2012

OTHER PUBLICATIONS

Non-Final Office Action dated Jan. 10, 2019 in U.S. Appl. No. 16/121,631.
(Continued)

*Primary Examiner* — Eric W Thomas
(74) *Attorney, Agent, or Firm* — McDermott Will & Emery LLP

(57) ABSTRACT

An electrolytic capacitor includes an anode body with a dielectric layer; a solid electrolyte layer in contact with the dielectric layer; and an electrolytic solution. The solid electrolyte layer includes a π-conjugated conductive polymer and a first sulfonic acid. The electrolytic solution includes a solvent and an acid component. The solvent includes a glycol compound. And a proportion of the glycol compound in the solvent is equal to or more than 50% by mass.

25 Claims, 1 Drawing Sheet

Related U.S. Application Data continuation of application No. PCT/JP2017/006469, filed on Feb. 22, 2017.

(51) Int. Cl.
    *H01G 9/145*      (2006.01)
    *H01G 9/15*      (2006.01)
    *C08G 61/12*      (2006.01)
    *C08K 5/20*      (2006.01)
    *C08L 65/00*      (2006.01)
    *H01G 11/48*      (2013.01)

(52) U.S. Cl.
    CPC ... *C08G 61/126* (2013.01); *C08G 2261/3223* (2013.01); *C08G 2261/794* (2013.01); *C08K 5/20* (2013.01); *C08L 65/00* (2013.01); *H01G 11/48* (2013.01)

(56) References Cited

U.S. PATENT DOCUMENTS

| | | |
|---|---|---|
| 2008/0316679 A1 | 12/2008 | Sugihara et al. |
| 2012/0214049 A1 | 8/2012 | Iwamoto et al. |
| 2015/0371785 A1* | 12/2015 | Naito ............... H01G 9/07 361/524 |
| 2016/0099113 A1 | 4/2016 | Komatsu et al. |

OTHER PUBLICATIONS

Final Office Action dated Aug. 8, 2019 in U.S. Appl. No. 16/121,631.
Notice of Allowance dated Jan. 8, 2020 in U.S. Appl. No. 16/121,631.
International Search Report of PCT Application No. PCT/JP2017/006469 dated May 30, 2017.

* cited by examiner

ELECTROLYTIC CAPACITOR

RELATED APPLICATIONS

This application is a continuation of U.S. application Ser. No. 16/121,631 filed Sep. 5, 2018, which is a continuation of the PCT International Application No. PCT/JP2017/006469 filed on Feb. 22, 2017, which claims the benefit of foreign priority of Japanese patent application No. 2016-052193 filed on Mar. 16, 2016, the contents of which are incorporated herein by reference.

TECHNICAL FIELD

The present disclosure relates to an electrolytic capacitor including a solid electrolyte layer and an electrolytic solution.

BACKGROUND

As capacitors having a small size, a large capacitance, and low ESR (Equivalent Series Resistance) capacitors, promising candidates are electrolytic capacitors including an anode body on which a dielectric layer is formed, a solid electrolyte layer formed so as to cover at least a part of the dielectric layer, and an electrolytic solution.

For the solid electrolyte layer, a π-conjugated conductive polymer with a dopant added thereto is used. It is known that the dopant gradually comes out into the electrolytic solution, which is called as a dedoping phenomenon. Thus, the conductive polymer degrades with time, thereby gradually increasing the ESR of the electrolytic capacitor.

Therefore, it is attempted that a dedoping phenomenon is suppressed by including an acid component in an electrolytic solution to decrease the pH value of the electrolytic solution (See Unexamined Japanese Patent Publication No. 2006-108650).

SUMMARY

An aspect of the present disclosure relates to an electrolytic capacitor including an anode body with a dielectric layer, a solid electrolyte layer in contact with the dielectric layer, and an electrolytic solution. The solid electrolyte layer includes a π-conjugated conductive polymer and a first sulfonic acid. The electrolytic solution includes a solvent and an acid component. The solvent includes a glycol compound. And a proportion of the glycol compound in the solvent is equal to or more than 50% by mass.

According to the present disclosure, there can be provided an electrolytic capacitor which is small in leakage current and low in ESR.

DESCRIPTION OF EMBODIMENT

Figure 1:
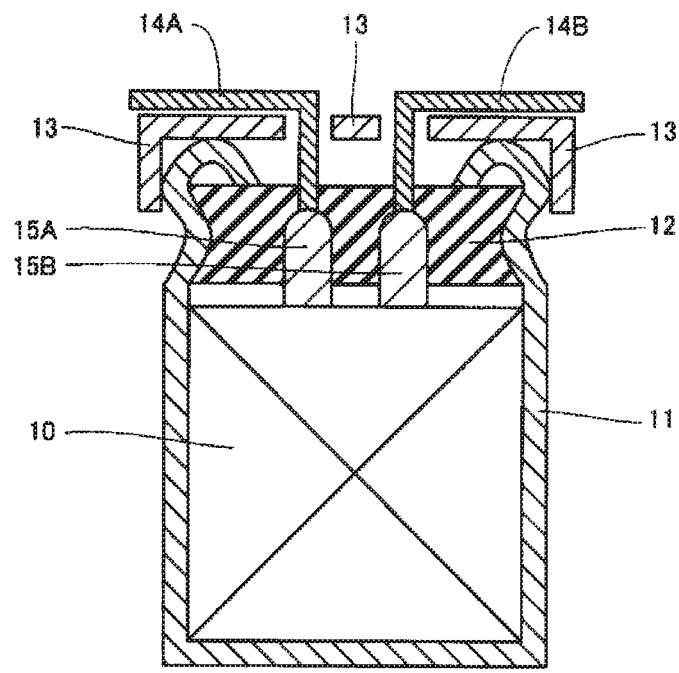
FIG. 1 is a schematic sectional view illustrating an electrolytic capacitor according to one exemplary embodiment of the present disclosure.

The acid component in the electrolytic solution inhibits the phenomenon of dedoping from a conductive polymer, and at the same time, has an action of corroding an electrode of an electrolytic capacitor. When the electrode is corroded, the leakage current is increased. Therefore, for suppressing electrode corrosion, it is common technique to exclude an acid component that exhibits strong acidity, and include an acid component that exhibits weak acidity in an electrolytic solution. However, since the acid component that exhibits weak acidity is relatively unstable, the inhibition of the dedoping phenomenon is limited.

The electrolytic capacitor according to the present disclosure includes an anode body with a dielectric layer; a solid electrolyte layer in contact with the dielectric layer; and an electrolytic solution. The solid electrolyte layer includes a π-conjugated conductive polymer (hereinafter, also referred to simply as a conductive polymer), and a first sulfonic acid. The electrolytic solution includes a solvent and an acid component, and the acid component includes a second sulfonic acid.

The first sulfonic acid functions as a dopant for the conductive polymer. The first sulfonic acid may be included as an anion in the solid electrolyte layer. On the other hand, the second sulfonic acid in the electrolytic solution has the function of inhibiting the dedoping phenomenon of the first sulfonic acid from the solid electrolyte layer, thereby stabilizing the conductivity of the conductive polymer. In addition, even in the case of first sulfonic acid dedoping from the conductive polymer, the dedoped site is re-doped with the second sulfonic acid, and ESR is thus less likely to be decreased. The carboxylic acid in the electrolytic solution is not found to have such a re-doping action. Furthermore, the second sulfonic acid is stable as compared with an acid component which exhibits weak acidity. Hence, by including the second sulfonic acid in the electrolytic solution, it is possible to keep the ESR of the electrolytic capacitor low even under high temperatures.

The acid component dissolved in the electrolytic solution preferably does not excessively increase the viscosity of the electrolytic solution, but easily dissociates in the electrolytic solution. And the acid component preferably produces an anion which moves easily in the solvent. On the other hand, the first sulfonic acid included in the solid electrolyte layer is preferably less likely to move significantly within the solid electrolyte layer so that it does not cause the dedoping phenomenon. Accordingly, the molecular weight of the second sulfonic acid is preferably lower than the molecular weight of the first sulfonic acid. In this case, the second sulfonic acid that has lower in molecular weight than the first sulfonic acid is likely to penetrate the dedoped site that the first sulfonic acid has been dedoped, and thus re-doping of the second sulfonic acid smoothly proceeds.

As the first sulfonic acid, aliphatic sulfonic acids, aromatic sulfonic acids, polymeric sulfonic acids, and the like can be used. Especially, the polymeric sulfonic acids are most preferred as the first sulfonic acid because the second sulfonic acid having a low molecular weight is more likely to proceed with re-doping, and the dedoping phenomenon is less likely to occur.

Examples of the aliphatic sulfonic acids include monovalent saturated aliphatic sulfonic acids such as methane sulfonic acid, ethane sulfonic acid, propane sulfonic acid, isopropyl sulfonic acid, butane sulfonic acid, isobutyl sulfonic acid, t-butyl sulfonic acid, pentane sulfonic acid, isopentyl sulfonic acid, hexane sulfonic acid, nonane sulfonic acid, decane sulfonic acid, undecane sulfonic acid, dodecane sulfonic acid, tridecane sulfonic acid, tetradecane sulfonic acid, n-octyl sulfonic acid, and cetyl sulfonic acid; monovalent unsaturated aliphatic sulfonic acids such as ethylene sulfonic acid, 1-propene-1 -sulfonic acid; and polyvalent aliphatic sulfonic acids such as methionic acid, 1,1-ethane disulfonic acid, 1,2-ethane disulfonic acid, 1,1-propane disulfonic acid, 1,3-propane disulfonic acid, and polyvinyl sulfonic acid. And aliphatic sulfonic acids having 1 to 30 carbon atoms are preferred.

Examples of the aromatic sulfonic acids include monovalent aromatic sulfonic acids such as benzene sulfonic acid, p-toluene sulfonic acid, o-toluene sulfonic acid, m-toluene sulfonic acid, o-xylene-4-sulfonic acid, m-xylene-4-sulfonic acid, 4-ethylbenzene sulfonic acid, 4-propylbenzene sulfonic acid, 4-butylbenzene sulfonic acid, 4-dodecylbenzene sulfonic acid, 4-octylbenzene sulfonic acid, 2-methyl-5-isopropylbenzene sulfonic acid, 2-naphthalene sulfonic acid, butylnaphthalene sulfonic acid, t-butylnaphthalene sulfonic acid, 2,4,5-trichlorobenzene sulfonic acid, benzyl sulfonic acid, and phenylethane sulfonic acid; polyvalent aromatic sulfonic acids such as m-benzene disulfonic acid, 1,4-naphthalene disulfonic acid, 1,5-naphthalene disulfonic acid, 1,6-naphthalene disulfonic acid, 2,6-naphthalene disulfonic acid, 2,7-naphthalene disulfonic acid, 1,3,6-naphthalene trisulfonic acid, and sulfonated polystyrene; oxyaromatic sulfonic acids such as phenol-2-sulfonic acid, phenol-3-sulfonic acid, phenol-4-sulfonic acid, anisole-o-sulfonic acid, anisole-m-sulfonic acid, phenetole-o-sulfonic acid, phenetole-m-sulfonic acid, phenol-2,4-disulfonic acid, phenol-2,4,6-trisulfonic acid, anisole-2,4-disulfonic acid, phenetole-2,5-disulfonic acid, 2-oxytoluene-4-sulfonic acid, pyrocatechine-4-sulfonic acid, veratrole-4-sulfonic acid, resorcin-4-sulfonic acid, 2-oxy-1-methoxybenzene-4-sulfonic acid, 1,2-dioxybenzene-3,5-disulfonic acid, resorcin-4,6-disulfonic acid, hydroquinone sulfonic acid, hydroquinone-2,5-disulfonic acid, 1,2,3-trioxybenzene-4-sulfonic acid; sulfoaromatic carboxylic acids such as o-sulfobenzoic acid, m-sulfobenzoic acid, p-sulfobenzoic acid, 2,4-disulfobenzoic acid, 3-sulfophthalic acid, 3,5-disulfophthalic acid, 4-sulfoisophthalic acid, 2-sulfoterephthalic acid, 2-methyl-4-sulfobenzoic acid, 2-methyl-3,5-disulfobenzoic acid, 4-propyl-3-sulfobenzoic acid, 2,4,6-trimethyl-3-sulfobenzoic acid, 2-methyl-5-sulfoterephthalic acid, 5-sulfosalicylic acid, and 3-oxy-4-sulfobenzoic acid; thioaromatic sulfonic acids such as thiophenol sulfonic acid, thioanisole-4-sulfonic acid, and thiophenetole-4-sulfonic acid; and aromatic sulfonic acids having other functional groups, such as benzaldehyde-o-sulfonic acid, benzaldehyde-2,4-disulfonic acid, acetophenone-o-sulfonic acid, acetophenone-2,4-disulfonic acid, benzophenone-o-sulfonic acid, benzophenone-3,3'-disulfonic acid, 4-aminophenol-3-sulfonic acid, anthraquinone-1-sulfonic acid, anthraquinone-1,5-disulfonic acid, anthraquinone-1,8-disulfonic acid, anthraquinone-2,6-disulfonic acid, 2-methylanthraquinone-1-sulfonic acid. And aromatic sulfonic acids having 6 to 30 carbon atoms are preferred.

Examples of the polymeric sulfonic acid include polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), and polyisoprenesulfonic acid. These sulfonic acids may be used alone or in combination of two or more of these sulfonic acids. These sulfonic acids may be a homopolymer, or a copolymer of two or more monomers. Especially, polystyrenesulfonic acid (PSS) is preferred. The weight-average molecular weight of the polymer sulfonic acid is not particularly limited but preferably ranges, for example, from 1000 to 100000, inclusive, in terms of facilitating the formation of a homogeneous solid electrolyte layer.

The sulfonic acids listed as the first sulfonic acid can be used also as the second sulfonic acid. Especially, aliphatic sulfonic acids having 1 to 30 carbon atoms and aromatic sulfonic acids having 6 to 30 carbon atoms are preferred. Among the aliphatic sulfonic acids, monovalent saturated aliphatic sulfonic acids (for example, hexanesulfonic acid) are preferred. Among the aromatic sulfonic acids, aromatic sulfonic acids having a hydroxy group or a carboxy group in addition to a sulfo group are preferred, and specifically, oxyaromatic sulfonic acids (for example, phenol-2-sulfonic acid), sulfoaromatic carboxylic acids (for example, p-sulfobenzoic acid, 3-sulfophthalic acid, 5-sulfosalicylic acid) are preferred.

For enhancing the effect of inhibiting the first sulfonic acid dedoping from the solid electrolyte layer, a concentration of the second sulfonic acid in the electrolytic solution preferably ranges from 5% by mass to 50% by mass, inclusive. When the concentration of the second sulfonic acid falls within the range mentioned above, electrode corrosion is also hardly evident. The concentration of the second sulfonic acid in the electrolytic solution is more preferably 15% by mass to 35% by mass, inclusive.

For enhancing the effect of stabilizing the ESR while effectively suppressing electrode corrosion, a third acid component may be included in the electrolytic solution. The third acid component may be an acid other than sulfuric acid and sulfonic acid. The third acid component is preferably an acid component that exhibits weak acidity. Examples of the component include a carboxylic acid, a boric acid, and a phosphonic acid. Especially, carboxylic acid is preferred. The concentration of the carboxylic acid in the electrolytic solution preferably ranges 5% by mass to 50% by mass, inclusive, more preferably 10% by mass to 30% by mass, inclusive, in terms of facilitating disassociation of carboxylic acid.

The carboxylic acid preferably contains an aromatic compound (aromatic dicarboxylic acid) having two or more carboxyl groups. The carboxyl group of the aromatic dicarboxylic acid is stable, thereby making a sub-reaction less likely to proceed. Therefore, the carboxyl group exhibits an effect of stabilizing the conductive polymer over a long period of time. Especially, at least one selected from the group consisting of o-phthalic acid and pyromellitic acid is preferred as the aromatic dicarboxylic acid.

The electrolytic solution may include a base component. The base component neutralizes at least a part of the acid component. Hence, the electrode corrosion caused by the acid component can be suppressed while increasing the concentration of the acid component. For effectively inhibiting the dedoping of the first sulfonic acid from the solid electrolyte layer, the acid component is preferably more excessive than the base component in terms of equivalence ratio. For example, the equivalence ratio of the acid component to the base component preferably ranges from 1.0 to 30, inclusive. In addition, the concentration of the base component in the electrolytic solution preferably ranges from 0.1% by mass to 20% by mass, inclusive, more preferably ranges from 3% by mass to 10% by mass, inclusive.

The base component is preferably at least one selected from the group consisting of ammonia, a primary amine, a secondary amine, a tertiary amine, a quaternary ammonium compound, and an amidinium compound. Especially, the base component is preferably at least one selected from the group consisting of a primary amine, a secondary amine, and a tertiary amine. The use of the primary to tertiary amines enhances an effect of stabilizing ESR for a long period of time. As each of the amines, an aliphatic amine, an aromatic amine, a heterocyclic amine, and the like can be used.

Especially, aliphatic amines with a molecular weight ranging from 72 to 102, inclusive, are preferred because of the high degree of dissociation.

Examples of the primary to tertiary amines include methylamine, dimethylamine, trimethylamine, ethylamine, diethylamine, triethylamine, ethylenediamine, N,N-diisopropylethyl amine, tetramethylethylene diamine, hexamethylene diamine, spermidine, spermine, amantadine, aniline, phenethylamine, toluidine, pyrrolidine, piperidine, piperazine, morpholine, imidazole, pyridine, pyridazine, pyrimidine, pyrazine, and 4-dimethylaminopyridine. These amines may be used alone or in combination of two or more of these amines. Especially, the tertiary amine is preferred, and in particular, triethylamine and monoethyldimethylamine are preferred. Diethyldimethylammonium salts and the like are preferred as the quaternary ammonium compound, and cyclic amidine salts such as a 1,2,3,4-tetramethylimidazolinium salt are preferred as the amidine compound.

The pH of the electrolytic solution is preferably less than or equal to 4, more preferably less than or equal to 3.8, still more preferably less than or equal to 3.6. When the pH of the electrolytic solution is less than or equal to 4, deterioration of the conductive polymer is further suppressed. The pH is preferably equal to or more than 2.0.

The solvent can include a glycol compound, a sulfone compound, a lactone compound, a carbonate compound, a monohydric or tri-or-more-hydric alcohol, or the like. As the glycol compound, ethylene glycol (EG), diethylene glycol, triethylene glycol, propylene glycol, polyethylene glycol (PEG), and the like can be used. As the sulfone compound, sulfolane, dimethyl sulfoxide, diethyl sulfoxide, and the like can be used. As the lactone compound, γ-butyrolactone, γ-valerolactone, and the like can be used. As the carbonate compound, dimethyl carbonate (DMC), diethyl carbonate (DEC), ethyl methyl carbonate (EMC), ethylene carbonate (EC), propylene carbonate (PC), fluoroethylene carbonate (FEC), and the like can be used. As the alcohol, for example, glycerin can be used. These alcohols and compounds may be used alone or in combination of a plurality of alcohols and compounds.

Especially, the solvent preferably contains at least one (hereinafter, main solvent) selected from the group consisting of γ-butyrolactone, sulfolane, and ethylene glycol. The proportion of the main solvent in the solvent is preferably equal to or more than 50% by mass, more preferably equal to or more than 60% by mass, even more preferably equal to or more than 70% by mass.

The solid electrolyte layer may be formed by a method of applying a solution containing a monomer and the dopant including the first sulfonic acid to the dielectric layer and then developing in-situ chemical polymerization or electrolytic polymerization. However, the solid electrolyte layer is preferably formed by a method of applying the conductive polymer to the dielectric layer in terms of the fact that excellent withstand voltage characteristics can be expected. More specifically, the solid electrolyte layer is preferably formed by impregnating the dielectric layer with a polymer dispersion containing a liquid component, the conductive polymer dispersed in the liquid component, and the first sulfonic acid (in particular, polymeric sulfonic acid), forming a film that covers at least a part of the dielectric layer, and then volatilizing the liquid component from the film.

The concentration of the conductive polymer in the polymer dispersion preferably ranges from 0.5% by mass to 10% by mass, inclusive. The average particle diameter D50 of the conductive polymer preferably ranges, for example, from 0.01 μm to 0.5 μm, inclusive. Here, the average particle diameter D50 is a median diameter in a volume particle size distribution which is obtained by a measuring apparatus of particle size distribution according to dynamic light scattering.

As the π-conjugated conductive polymer, polypyrrole, polythiophene, polyaniline and the like are preferable. In the present specification, polypyrrole, polythiophene, polyaniline, and the like mean polymers having, as a basic skeleton, polypyrrole, polythiophene, polyaniline, and the like, respectively. Therefore, polypyrrole, polythiophene, polyaniline, and the like also include derivatives of polypyrrole, polythiophene, polyaniline, and the like, respectively. For example, the polythiophene includes poly(3,4-ethylenedioxythiophene) (PEDOT) which is a derivative of the polythiophene. These conductive polymers may be used alone, or two or more of the conductive polymers may be used in combination, or a copolymer of two or more monomers may be adopted. The weight-average molecular weight of the conductive polymer is not particularly limited and ranges from 1000 to 100000, inclusive, for example.

Hereinafter, the present disclosure is more specifically described with reference to an exemplary embodiment. The exemplary embodiment below, however, is not to limit the present disclosure.

Figure 2:
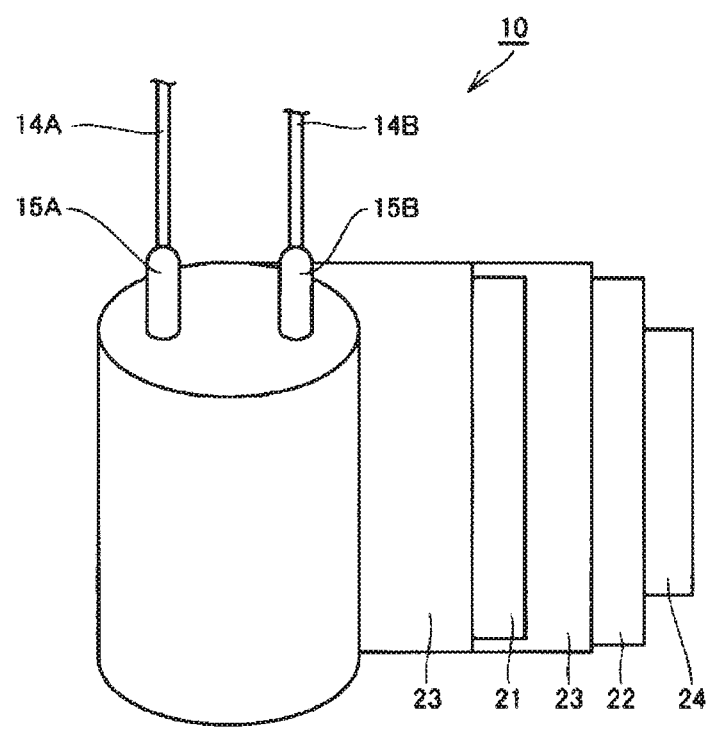
FIG. 2 is a schematic view for illustrating a configuration of a capacitor element according to the same exemplary embodiment.

FIG. 1 is a schematic sectional view illustrating an electrolytic capacitor according to the present exemplary embodiment, and FIG. 2 is a schematic view obtained by developing a part of a capacitor element for the electrolytic capacitor.

The electrolytic capacitor includes, for example, capacitor element 10, bottomed case 11 that houses capacitor element 10, sealing member 12 that seals an opening of bottomed case 11, base plate 13 that covers sealing member 12, lead wires 14A, 14B that are led out from sealing member 12 and penetrate base plate 13, lead tabs 15A, 15B that connect the lead wires to electrodes of capacitor element 10, respectively, and an electrolytic solution (not shown). Bottomed case 11 is, at a part near an opening end, processed inward by drawing, and is, at the opening end, curled to swage sealing member 12.

Capacitor element 10 is formed of a wound body as illustrated in FIG. 2. The wound body includes anode body 21 connected to lead tab 15A, cathode body 22 connected to lead tab 15B, and separator 23. The wound body is a semi-finished product where no solid electrolyte layer is formed between anode body 21 and cathode body 22.

Anode body 21 and cathode body 22 are wound with separator 23 interposed between the anode body and the cathode body. An outermost periphery of the wound body is fixed with fastening tape 24. FIG. 2 shows partially developed wound body before the outermost periphery of the wound body is fixed. As a material for separator 23, a nonwoven fabric can be used that contains, as a main constituent, for example, a cellulose, polyethylene terephthalate, vinylon, or aramid fiber, or the like.

Anode body 21 includes a metal foil whose surface is roughened so as to have projections and recesses, and the dielectric layer is formed on the metal foil having the projections and recesses. A conductive polymer is attached to at least a part of a surface of the dielectric layer to form a solid electrolyte layer. The solid electrolyte layer may cover at least a part of a surface of cathode body 22 and/or at least a part of a surface of separator 23. Capacitor element 10 in which the solid electrolyte layer has been formed is housed in an outer case together with the electrolytic solution.

<<Method for Producing Electrolytic Capacitor>>

Hereinafter, steps of one exemplary method for producing the electrolytic capacitor according to the present exemplary embodiment are described.

(i) Step of Preparing Anode Body 21 with Dielectric Layer

First, a metal foil as a raw material for anode body 21 is prepared. The type of the metal is not particularly limited, but it is preferred to use a valve metal such as aluminum, tantalum, or niobium, or an alloy including a valve metal, from the viewpoint of facilitating formation of a dielectric layer.

Next, the surface of the metal foil is roughened. By the roughening, a plurality of projections and recesses are formed on the surface of the metal foil. The roughening is preferably performed by etching the metal foil. The etching may be performed by, for example, a direct-current electrolytic method or an alternating-current electrolytic method.

Next, a dielectric layer is formed on the roughened surface of the metal foil. The method for forming the dielectric layer is not particularly limited, and the dielectric layer can be formed by subjecting the metal foil to an anodizing treatment. The anodizing treatment is performed by, for example, immersing the metal foil in an anodizing solution such as an ammonium adipate solution, followed by a heat treatment. The anodizing treatment may also be performed by applying a voltage to the metal foil that has been immersed in the anodizing solution.

Normally, a large foil of, for example, a valve metal (metal foil) is subjected to the roughening treatment and the anodizing treatment from the viewpoint of mass productivity. In this case, the treated foil is cut into a desired size to prepare anode body 21.

(ii) Step of Preparing Cathode Body 22

A metal foil can be used for cathode body 22 as with the anode body. The type of the metal is not particularly limited, but it is preferred to use a valve metal such as aluminum, tantalum, or niobium, or an alloy including a valve metal. The surface of cathode body 22 may be roughened as necessary.

In addition, a layer containing titanium or carbon may be formed on the surface of cathode body 22.

(iii) Preparation of Wound Body

Next, anode body 21, cathode body 22, and separator 23 are used to prepare a wound body as shown in FIG. 2. Next, an end of the cathode body 22 located at the outermost layer is fixed with fastening tape 24. When anode body 21 is prepared by cutting a large metal foil, the wound body may further be subjected to an anodizing treatment in order to provide a dielectric layer on the cutting surface of anode body 21.

(iv) Step of Forming Capacitor Element 10

Next, a solid electrolyte layer including a conductive polymer is formed on the surface of the dielectric layer included in the wound body, thereby preparing capacitor element 10. A solid electrolyte layer may be formed by attaching to the dielectric layer a conductive polymer produced by in-situ chemical polymerization or electrolytic polymerization with the use of a polymerization liquid. The polymerization liquid is a solution containing a monomer or an oligomer, the first sulfonic acid as a dopant, and the like. In the case of chemical polymerization, an oxidant is added to the polymerization liquid. Alternatively, a conductive polymer synthesized in advance may be deposited onto the dielectric layer, thereby forming a solid electrolyte layer.

Pyrrole, aniline, thiophene, a derivative of pyrrole, aniline, or thiophene, or the like is used for the monomer or the oligomer. The first sulfonic acid is used as the dopant. The first sulfonic acid is preferably, but not limited thereto, the already mentioned polymeric sulfonic acid because the dedoping phenomenon is easily inhibited.

As the conductive polymer synthesized in advance, it is preferable to use a polymer dispersion. The polymer dispersion includes a liquid component and a conductive polymer dispersed in the liquid component, and typically also includes a dopant. The method for applying the polymer dispersion to a surface of the dielectric layer is preferably, for example, a method of impregnating the wound body with the polymer dispersion and drying the wound body with the polymer dispersion, because the method is simple. The polymer dispersion preferably includes, together with the conductive polymer, the first sulfonic acid as a dopant. For example, a polymer dispersion (PEDOT/PSS) containing PEDOT as the conductive polymer and PSS as the first sulfonic acid is preferred.

The step of applying the polymer dispersion to the surface of the dielectric layer and the step of drying the wound body may be repeated two or more times. These steps can be performed a plurality of times to increase coverage of the solid electrolyte layer on the dielectric layer.

(v) Step of Impregnating Capacitor Element 10 with Electrolytic Solution

Next, capacitor element 10 is impregnated with an electrolytic solution. The method for impregnating capacitor element 10 with an electrolytic solution is not particularly limited.

(vi) Step of Encapsulating Capacitor Element

Next, capacitor element 10 is housed in bottomed case 11. As a material for bottomed case 11, there can be used metals such as aluminum, stainless steel, copper, iron, and brass, or alloys of these metals. Thereafter, bottomed case 11 is, at a part near an opening end, processed by transverse drawing, and is, at the opening end, curled to swage sealing member 12. Then, base plate 13 is disposed on a curled part of the bottomed case to complete the electrolytic capacitor as illustrated in FIG. 1. Then, an aging treatment may be performed while a rated voltage is applied.

In the exemplary embodiment described above, a wound electrolytic capacitor has been described. The application range of the present disclosure, however, is not limited to the wound electrolytic capacitor and can also be applied to other electrolytic capacitors such as a chip electrolytic capacitor including a metal sintered body as an anode body, and a laminated electrolytic capacitor including a metal plate as an anode body.

EXAMPLES

Hereinafter, the present disclosure will be described in more detail with reference to examples; however, the present disclosure is not to be considered to be limited to the examples.

Example 1

A wound electrolytic capacitor (Φ10 mm×L (length) 10 mm) with a rated voltage of 80 V and a rated electrostatic capacity of 33 µF was prepared in the following manner.

(Preparation of Anode Body)

A 100-µm-thick aluminum foil was subjected to etching to roughen a surface of the aluminum foil. The roughened surface of the aluminum foil was subjected to an anodizing treatment to form a dielectric layer. The anodizing treatment was performed by immersing the aluminum foil in an ammonium adipate solution and applying a voltage of 150 V to the aluminum foil. Thereafter, the aluminum foil was cut into a size of 6 mm×120 mm to prepare an anode body.
(Preparation of Cathode Body)

A 50-μm-thick aluminum foil was subjected to etching to roughen a surface of the aluminum foil. Thereafter, the aluminum foil was cut into a size of 6 mm×120 mm to prepare a cathode body.
(Preparation of Wound Body)

An anode lead tab and a cathode lead tab were connected to the anode body and the cathode body, respectively, and the anode body and the cathode body were wound with a separator interposed between the anode body and the cathode body while the lead tabs were rolled in the anode body, the cathode body, and the separator. Ends of the lead tabs protruding from the wound body were connected to an anode lead wire and a cathode lead wire, respectively. The wound body obtained was anodized again to form a dielectric layer at the cut end of the anode body. The end of the outer surface of the wound body was fixed with a fastening tape.
(Preparation of Polymer Dispersion)

A mixed solution was prepared by dissolving 3,4-ethylenedioxythiophene and a polymer sulfonic acid (first sulfonic acid), i.e., polystyrenesulfonic acid (PSS, weight-average molecular weight 100000) in ion-exchanged water. While the mixed solution was stirred, iron (III) sulfate (oxidant) was added to the mixed solution to cause a polymerization reaction. Thereafter, the reaction solution was dialyzed to remove unreacted monomers and the oxidant, so that a polymer dispersion was obtained that contained about 5% by mass of polyethylene dioxythiophene doped with PSS (PEDOT/PSS).
(Formation of Solid Electrolyte Layer)

The wound body was immersed in the polymer dispersion in a reduced-pressure atmosphere (40 kPa) for 5 minutes, and then the wound body was picked up from the polymer dispersion. Next, the wound body that had been impregnated with the polymer dispersion was dried in a drying furnace at 150° C. for 20 minutes to form a solid electrolyte layer covering at least a part of the dielectric layer.
(Impregnation with Electrolytic Solution)

Ethylene glycol (EG) was prepared as a solvent. 5-sulfosalicylic acid (divalent acid component) as the second sulfonic acid and triethylamine as the base component were dissolved in the EG at a concentration of 25% by mass in total, thereby preparing an electrolytic solution. The equivalence ratio of the 5-sulfosalicylic acid to the triethylamine was adjusted to 2.0. The capacitor element was immersed in an electrolytic solution for 5 minutes in an atmosphere of a reduced pressure (40 kPa).
(Encapsulation of Capacitor Element)

The capacitor element that had been impregnated with the electrolytic solution was encapsulated to complete electrolytic capacitor (A1) as shown in FIG. 1. Thereafter, aging was performed at 95° C. for 90 minutes while applying a rated voltage.
<Evaluation>

The electrostatic capacity, ESR, and leakage current (LC) at 80 V after the aging were measured for electrolytic capacitor A1.

Example 2

In the same manner as in Example 1 except for using hexanesulfonic acid instead of 5-sulfosalicylic acid without changing the molar ratio between the second sulfonic acid and base component, electrolytic capacitor A2 was prepared, and evaluated in the same manner.

Example 3

In the same manner as in Example 1 except for using p-toluenesulfonic acid instead of 5-sulfosalicylic acid without changing the molar ratio between the second sulfonic acid and base component, electrolytic capacitor A3 was prepared, and evaluated in the same manner. The results are shown in Table 1.

Example 4

In the same manner as in Example 1 except for using 2-naphthalenesulfonic acid instead of 5-sulfosalicylic acid without changing the molar ratio between the second sulfonic acid and base component, electrolytic capacitor A4 was prepared, and evaluated in the same manner.

Example 5

In the same manner as in Example 1 except for using phenol-2-sulfonic acid instead of 5-sulfosalicylic acid without changing the molar ratio between the second sulfonic acid and base component, electrolytic capacitor A5 was prepared, and evaluated in the same manner.

Example 6

In the same manner as in Example 1 except for using p-sulfobenzoic acid instead of 5-sulfosalicylic acid without changing the molar ratio between the second sulfonic acid and base component, electrolytic capacitor A6 was prepared, and evaluated in the same manner.

Example 7

In the same manner as in Example 1 except for using 3-sulfophthalic acid instead of 5-sulfosalicylic acid without changing the molar ratio between the second sulfonic acid and base component, electrolytic capacitor A7 was prepared, and evaluated in the same manner.

Example 8

In the same manner as in Example 1 except for changing the solute concentration in the electrolytic solution from 25% by mass to 5% by mass without changing the molar ratio between the second sulfonic acid and base component, electrolytic capacitor A8 was prepared, and evaluated in the same manner.

Example 9

In the same manner as in Example 1 except for changing the solute concentration in the electrolytic solution from 25% by mass to 15% by mass without changing the molar ratio between the second sulfonic acid and base component, electrolytic capacitor A9 was prepared, and evaluated in the same manner.

Example 10

In the same manner as in Example 1 except for changing the solute concentration in the electrolytic solution from 25% by mass to 35% by mass without changing the molar ratio between the second sulfonic acid and base component, electrolytic capacitor A10 was prepared, and evaluated in the same manner.

Example 11

In the same manner as in Example 1 except for changing the solute concentration in the electrolytic solution from 25% by mass to 50% by mass without changing the molar ratio between the second sulfonic acid and base component, electrolytic capacitor A11 was prepared, and evaluated in the same manner.

Example 12

In the same manner as in Example 1 except for using 5-sulfosalicylic acid and phthalic acid at a ratio by mass of 1:1 without changing the molar ratio between the acid component and base component, electrolytic capacitor A12 was prepared, and evaluated in the same manner.

Comparative Example 1

In the same manner as in Example 1 except for using phthalic acid instead of 5-sulfosalicylic acid without changing the molar ratio between the acid component and base component, electrolytic capacitor B1 was prepared, and evaluated in the same manner.

Comparative Example 2

In the same manner as in Example 1 except for using sulfuric acid instead of 5-sulfosalicylic acid and using ammonia instead of triethylamine without changing the molar ratio between the acid component and base component, electrolytic capacitor B2 was prepared, and evaluated in the same manner.

TABLE 1

| Electrolytic capacitor | Electrostatic capacitance (µF) | ESR (mΩ) | LC (µA) |
| --- | --- | --- | --- |
| A1 | 306 | 10 | 3.11 |
| A2 | 305 | 15 | 3.15 |
| A3 | 306 | 15 | 3.21 |
| A4 | 304 | 16 | 3.08 |
| A5 | 305 | 10 | 3.26 |
| A6 | 305 | 11 | 3.13 |
| A7 | 306 | 11 | 3.09 |
| A8 | 275 | 24 | 8.55 |
| A9 | 297 | 15 | 4.45 |
| A10 | 306 | 15 | 3.26 |
| A11 | 305 | 20 | 3.10 |
| A12 | 305 | 11 | 3.20 |
| B1 | 288 | 38 | 3.12 |
| B2 | 350 | 28 | 268.12 |

The present disclosure can be applied to a so-called hybrid-type electrolytic capacitor that includes a solid electrolyte layer covering at least a part of a dielectric layer, and an electrolytic solution.

What is claimed is:

1. An electrolytic capacitor comprising:
   an anode body with a dielectric layer;
   a solid electrolyte layer in contact with the dielectric layer; and
   an electrolytic solution, wherein:
   the solid electrolyte layer includes a π-conjugated conductive polymer and a first sulfonic acid,
   the electrolytic solution includes a solvent and an acid component,
   the acid component includes a second sulfonic acid, and the second sulfonic acid includes an aliphatic sulfonic acid.

2. The electrolytic capacitor according to claim 1, wherein a molecular weight of the second sulfonic acid is lower than a molecular weight of the first sulfonic acid.

3. The electrolytic capacitor according to claim 1, wherein a concentration of the second sulfonic acid in the electrolytic solution ranges from 5% by mass to 50% by mass, inclusive.

4. The electrolytic capacitor according to claim 1, wherein:
   the acid component includes a third acid component, and the third acid component is an acid other than a sulfuric acid and a sulfonic acid.

5. The electrolytic capacitor according to claim 4, wherein the third acid component includes a carboxylic acid.

6. The electrolytic capacitor according to claim 1, wherein the electrolytic solution includes a base component, and includes the acid component more excessively than the base component in equivalence ratio.

7. The electrolytic capacitor according to claim 6, wherein the base component is at least one selected from the group consisting of ammonia, a primary amine, a secondary amine, a tertiary amine, a quaternary ammonium compound, and an amidinium compound.

8. The electrolytic capacitor according to claim 1, wherein the π-conjugated conductive polymer is polythiophene or a derivative of the polythiophene.

9. The electrolytic capacitor according to claim 1, wherein:
   the solvent includes a glycol compound, and
   a proportion of the glycol compound in the solvent is equal to or more than 50% by mass.

10. The electrolytic capacitor according to claim 9, wherein the glycol compound includes at least one selected from the group consisting of ethylene glycol, diethylene glycol, triethylene glycol, propylene glycol, and polyethylene glycol.

11. The electrolytic capacitor according to claim 1, wherein the aliphatic sulfonic acid has 1 to +carbon atoms.

12. The electrolytic capacitor according to claim 1, wherein the aliphatic sulfonic acid includes at least one selected from the group consisting of a monovalent saturated aliphatic sulfonic acid, a monovalent unsaturated aliphatic sulfonic acid, and polyvalent aliphatic sulfonic acid.

13. The electrolytic capacitor according to claim 1, wherein the aliphatic sulfonic acid includes at least one selected from the group consisting of methane sulfonic acid, ethane sulfonic acid, propane sulfonic acid, isopropyl sulfonic acid, butane sulfonic acid, isobutyl sulfonic acid, t-butyl sulfonic acid, pentane sulfonic acid, isopentyl sulfonic acid, hexane sulfonic acid, nonane sulfonic acid, decane sulfonic acid, undecane sulfonic acid, dodecane sulfonic acid, tridecane sulfonic acid, tetradecane sulfonic acid, n-octyl sulfonic acid, cetyl sulfonic acid, ethylene sulfonic acid, 1-propen-1-sulfonic acid, methionic acid, 1,1-ethane disulfonic acid, 1,2-ethane disulfonic acid, 1,1-propane disulfonic acid, 1,3-propane disulfonic acid, and polyvinyl sulfonic acid.

14. An electrolytic capacitor comprising:
   an anode body with a dielectric layer;
   a solid electrolyte layer in contact with the dielectric layer; and
   an electrolytic solution, wherein:
   the solid electrolyte layer includes a π-conjugated conductive polymer and a first sulfonic acid, the electrolytic solution includes a solvent and an acid component, the acid component includes a second sulfonic acid, and the second sulfonic acid includes a polymeric sulfonic acid.

15. The electrolytic capacitor according to claim 14, wherein the polymeric sulfonic acid includes at least one selected from the group consisting of polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), and polyisoprenesulfonic acid.

16. The electrolytic capacitor according to claim 14, wherein the polymeric sulfonic acid includes polystyrenesulfonic acid.

17. The electrolytic capacitor according to claim 14, wherein a molecular weight of the second sulfonic acid is lower than a molecular weight of the first sulfonic acid.

18. The electrolytic capacitor according to claim 14, wherein a concentration of the second sulfonic acid in the electrolytic solution ranges from 5% by mass to 50% by mass, inclusive.

19. The electrolytic capacitor according to claim 14, wherein:

the acid component includes a third acid component, and
the third acid component is an acid other than a sulfuric acid and a sulfonic acid.

20. The electrolytic capacitor according to claim 19, wherein the third acid component includes a carboxylic acid.

21. The electrolytic capacitor according to claim 14, wherein the electrolytic solution includes a base component, and includes the acid component more excessively than the base component in equivalence ratio.

22. The electrolytic capacitor according to claim 21, wherein the base component is at least one selected from the group consisting of ammonia, a primary amine, a secondary amine, a tertiary amine, a quaternary ammonium compound, and an amidinium compound.

23. The electrolytic capacitor according to claim 14, wherein the $\pi$-conjugated conductive polymer is polythiophene or a derivative of the polythiophene.

24. The electrolytic capacitor according to claim 14, wherein:

the solvent includes a glycol compound, and
a proportion of the glycol compound in the solvent is equal to or more than 50% by mass.

25. The electrolytic capacitor according to claim 24, wherein the glycol compound includes at least one selected from the group consisting of ethylene glycol, diethylene glycol, triethylene glycol, propylene glycol, and polyethylene glycol.

* * * * *